(12) United States Patent
Zhang et al.

(10) Patent No.: US 11,055,086 B2
(45) Date of Patent: *Jul. 6, 2021

(54) METHOD AND APPARATUS FOR UPGRADING VHOST-NET MODULE

(71) Applicant: Alibaba Group Holding Limited, Grand Cayman (KY)

(72) Inventors: Xiantao Zhang, Hangzhou (CN); Junkang Fu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 7 days.

This patent is subject to a terminal disclaimer.

(21) Appl. No.: 16/685,913

(22) Filed: Nov. 15, 2019

(65) Prior Publication Data

US 2020/0081707 A1 Mar. 12, 2020

Related U.S. Application Data

(63) Continuation of application No. 15/818,575, filed on Nov. 20, 2017, now Pat. No. 10,521,221, which is a
(Continued)

(30) Foreign Application Priority Data

May 21, 2015 (CN) .......................... 201510264571.0

(51) Int. Cl.
*G06F 8/656* (2018.01)
*G06F 9/455* (2018.01)
*G06F 8/65* (2018.01)

(52) U.S. Cl.
CPC ................ *G06F 8/656* (2018.02); *G06F 8/65* (2013.01); *G06F 9/455* (2013.01); *G06F 9/4555* (2013.01)

(58) Field of Classification Search
None
See application file for complete search history.

(56) References Cited

U.S. PATENT DOCUMENTS

| 2012/0072894 A1 | 3/2012 | Wang et al. |
| 2014/0229928 A1 | 8/2014 | Edstrom et al. |
| 2018/0074837 A1 | 3/2018 | Zhang et al. |

FOREIGN PATENT DOCUMENTS

| CN | 101252464 A | 8/2008 |
| CN | 201332404 Y | 10/2009 |

(Continued)

OTHER PUBLICATIONS

Machine Translation of Chinese Office Action dated Nov. 21, 2018 for Chinese patent application No. 201510264571.0, a counterpart foreign application of U.S. Appl. No. 15/818,575, 4 pages.

(Continued)

*Primary Examiner* — Qing Yuan Wu
(74) *Attorney, Agent, or Firm* — Lee & Hayes, P.C.

(57) ABSTRACT

A method and an apparatus for upgrading a para-virtualized network adapter kernel acceleration module are disclosed. The method includes switching a network flow of a first para-virtualized network adapter kernel acceleration module to a user mode for transmission; removing the first para-virtualized network adapter kernel acceleration module; inserting a second para-virtualized network adapter kernel acceleration module; and switching a transmission of the network flow in the user mode to a transmission by the second para-virtualized network adapter kernel acceleration module. The method and the apparatus for upgrading a para-virtualized network adapter kernel acceleration module switches between a kernel mode and a user mode for a network flow without affecting fluctuations in a network flow of a virtual machine. An upgrade of a para-virtualized
(Continued)

FIG. 3 network adapter kernel acceleration module is achieved, which is unnoticeable by a user, and user experience is not affected.

20 Claims, 4 Drawing Sheets

Related U.S. Application Data continuation of application No. PCT/CN2016/081953, filed on May 13, 2016.

(56) References Cited

FOREIGN PATENT DOCUMENTS

| CN | 102591715 A | 7/2012 |
|---|---|---|
| CN | 104423978 A | 3/2015 |
| WO | WO2009086681 A1 | 7/2009 |

OTHER PUBLICATIONS

Chinese Search Report dated Oct. 10, 2018, for Chinese patent application No. 201510264571.0, 2 pages.
Translation of International Search Report from corresponding PCT application No. PCT/CN2016/081953 dated Aug. 15, 2016, 2 pages.
Translation of Written Opinion from corresponding PCT application No. PCT/CN2016/081953 dated Aug. 15, 2016, 7 pages.

METHOD AND APPARATUS FOR UPGRADING VHOST-NET MODULE

CROSS REFERENCE TO RELATED PATENT APPLICATIONS

This application is a continuation of and claims priority to U.S. patent application Ser. No. 15/818,575, filed on Nov. 20, 2017, which claims priority to and is a continuation of PCT Patent Application No. PCT/CN2016/081953 filed on 13 May 2016, and is related to and claims priority to Chinese Patent Application No. 201510264571.0, filed on 21 May 2015, entitled "Method and Apparatus for Upgrading vhost-net Module," which are hereby incorporated by reference in their entirety.

TECHNICAL FIELD

The present disclosure relates to the field of computers, and particularly to methods and apparatuses for upgrading a vhost-net module.

BACKGROUND

A para-virtualized network adapter kernel acceleration (vhost-net) module is an important component of a kernel-based virtual machine (KVM). The para-virtualized network adapter kernel acceleration module can improve the performance of a KVM virtual machine network by 30%.

In existing technologies, a virtual machine needs to be shut down when a para-virtualized network adapter kernel acceleration module is upgraded. After an original para-virtualized network adapter kernel acceleration module is removed, a new para-virtualized network adapter kernel acceleration module is inserted and the virtual machine is restarted. This type of method of upgrading a para-virtualized network adapter kernel acceleration module requires a temporary shutdown of a virtual machine, causing an interruption in services during the shutdown, and having a bad influence to a service provider and customers.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure aims to provide a method and an apparatus for upgrading a para-virtualized network adapter kernel acceleration module.

In implementations, the present disclosure provides a method for upgrading a para-virtualized network adapter kernel acceleration module, which includes switching a network flow of a first para-virtualized network adapter kernel acceleration module to a user mode for transmission; removing the first para-virtualized network adapter kernel acceleration module; inserting a second para-virtualized network adapter kernel acceleration module; and switching a transmission of the network flow in the user mode to a transmission by the second para-virtualized network adapter kernel acceleration module.

In implementations, the present disclosure provides an apparatus for upgrading a para-virtualized network adapter kernel acceleration module, which includes one or more processors, and memory storing executable instructions that, when executed by the one or more processors, cause the one or more processors to perform acts comprising: switching a network flow of a first para-virtualized network adapter kernel acceleration module to a user mode for transmission; removing the first para-virtualized network adapter kernel acceleration module; inserting a second para-virtualized network adapter kernel acceleration module; and switching a transmission of the network flow in the user mode to a transmission by the second para-virtualized network adapter kernel acceleration module.

As compared with the existing technologies, when a para-virtualized network adapter kernel acceleration module is upgraded, the present disclosure first switches a network flow from a kernel mode to a user mode for transmission, inserts an upgraded para-virtualized network adapter kernel acceleration module into a system, and switches a transmission of a network flow in the user mode to a transmission by the new para-virtualized network adapter kernel acceleration module in the kernel mode, without service interruptions. Switching between a kernel mode and a user mode for a network flow does not affect fluctuations in a network flow of a virtual machine. An upgrade of a para-virtualized network adapter kernel acceleration module is achieved, which is unnoticeable by a user, and user experience is not affected.

BRIEF DESCRIPTION OF THE DRAWINGS

By reading and referencing the detailed description of non-limiting embodiments made by the following figures, other features, purposes and advantages of the present disclosure are made more clearly.

Same or similar figure labels in the figures represent same or similar components.

DETAILED DESCRIPTION

The present disclosure is described in further detail in conjunction with the accompanying figures.

Figure 1:
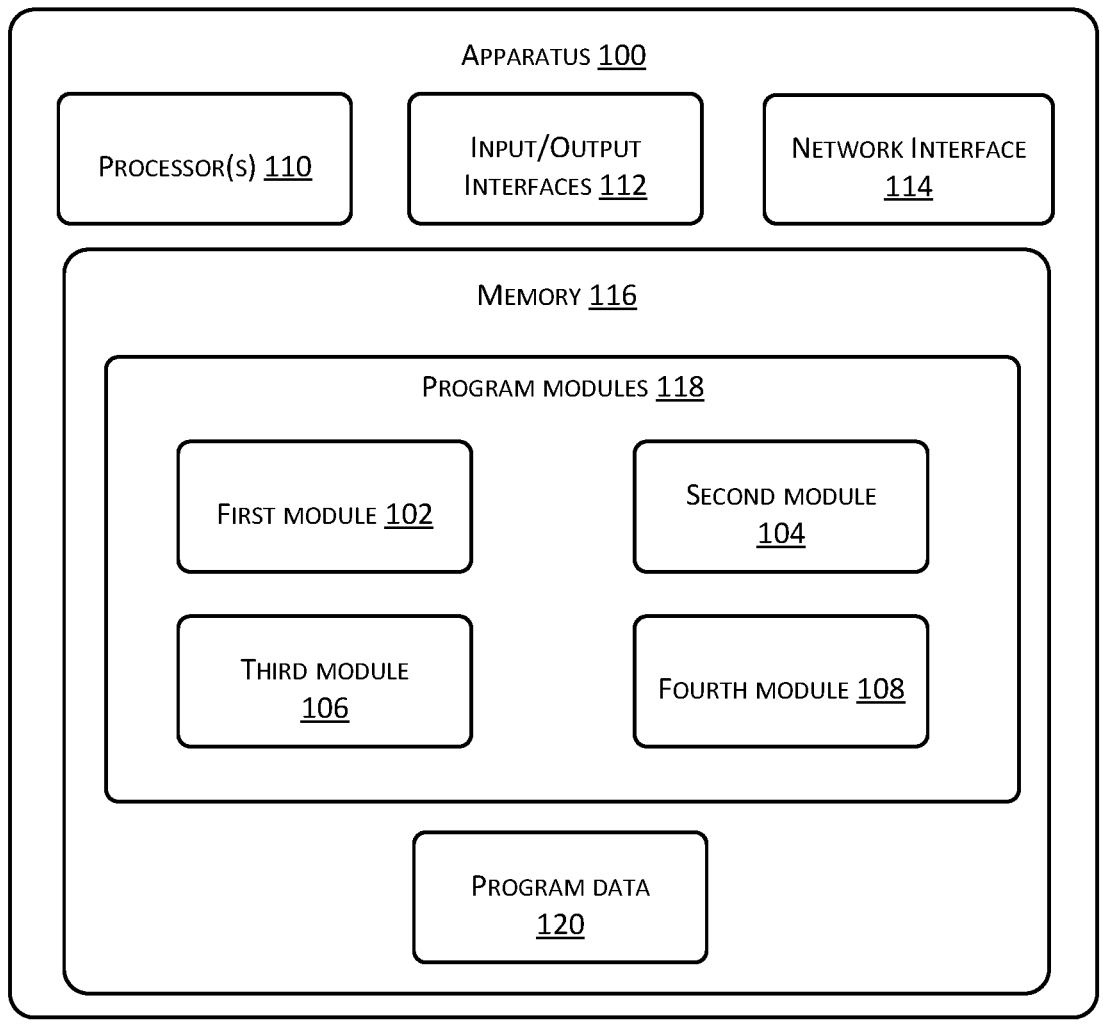
FIG. 1 shows a schematic structural diagram of an apparatus of upgrading a para-virtualized network adapter kernel acceleration module in accordance with the present disclosure.

FIG. 1 shows a schematic structural diagram of an apparatus 100 of upgrading a para-virtualized network adapter kernel acceleration module in accordance with the present disclosure. As shown in FIG. 1, the apparatus 100 includes a first module 102, a second module 104, a third module 106, and a fourth module 108.

In implementations, the apparatus 100 may further include one or more processors 110, an input/output (I/O) interface 112, a network interface 114, and memory 116.

The memory 116 may include a form of processor-readable media or computer-readable media such as a volatile memory, a random access memory (RAM) and/or a non-volatile memory, for example, a read-only memory (ROM) or a flash RAM. The memory 116 is an example of a processor-readable media or computer-readable media.

The processor-readable media or computer readable media may include a volatile or non-volatile type, a removable or non-removable media, which may achieve storage of information using any method or technology. The information may include a processor-readable or computer-readable instruction, a data structure, a program module or other data. Examples of processor-storage media or computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media and the computer readable media do not include transitory media, such as modulated data signals and carrier waves.

In implementations, the memory 116 may include program modules 118 and program data 120. The program modules 118 may include the first module 102, the second module 104, the third module 106, and the fourth module 108.

The first module 102 is used for switching a network flow of a first para-virtualized network adapter kernel acceleration module to a user mode for transmission. The second module 104 is used for removing the first para-virtualized network adapter kernel acceleration module. The third module 106 is used for inserting a second para-virtualized network adapter kernel acceleration module. The fourth module 108 is used for switching a transmission of the network flow in the user mode to a transmission by the second para-virtualized network adapter kernel acceleration module.

A para-virtualized network adapter kernel acceleration module can use a KVM-virtualized vhost-net module. A vhost-net module is used for accelerating a para-virtualized network adapter (virtio-net) of a machine virtualizer (QEMU). The first para-virtualized network adapter kernel acceleration module refers to a vhost-net module prior to an upgrade, and the second para-virtualized network adapter kernel acceleration module refers to a new vhost-net module after the upgrade. The first module switches a network flow of the old vhost-net module to a user mode for transmission. Under the user mode, when sending or receiving a data packet, a virtual machine first runs into a kernel mode, and then returns to a QEMU (quick emulator) process of a user mode for processing. The data packet is finally sent or received via a network by a network bridge, a physical network adapter through a virtual Ethernet network device (a TAP device). After switching the network flow of the old vhost-net module to the user mode for transmission, the second module 104 can remove the old vhost-net module, without any interruption in network services. The third module 106 then inserts the new vhost-net module. The fourth module 108 switches the transmission of the network flow in the user mode to a transmission by the newly upgraded vhost-net module in the kernel mode. Under the kernel mode, the virtual machine does not need to return to the user mode after running into the kernel mode, and processing is performed by a kernel thread of the new vhost-net module. Sending or receiving a data packet is performed by the network bridge, the physical network adapter through the virtual Ethernet network device (a TAP device). By switching between a user mode and a kernel mode, services are not interrupted when an old vhost-net module is removed and a newly upgraded vhost-net module is inserted.

Figure 2:
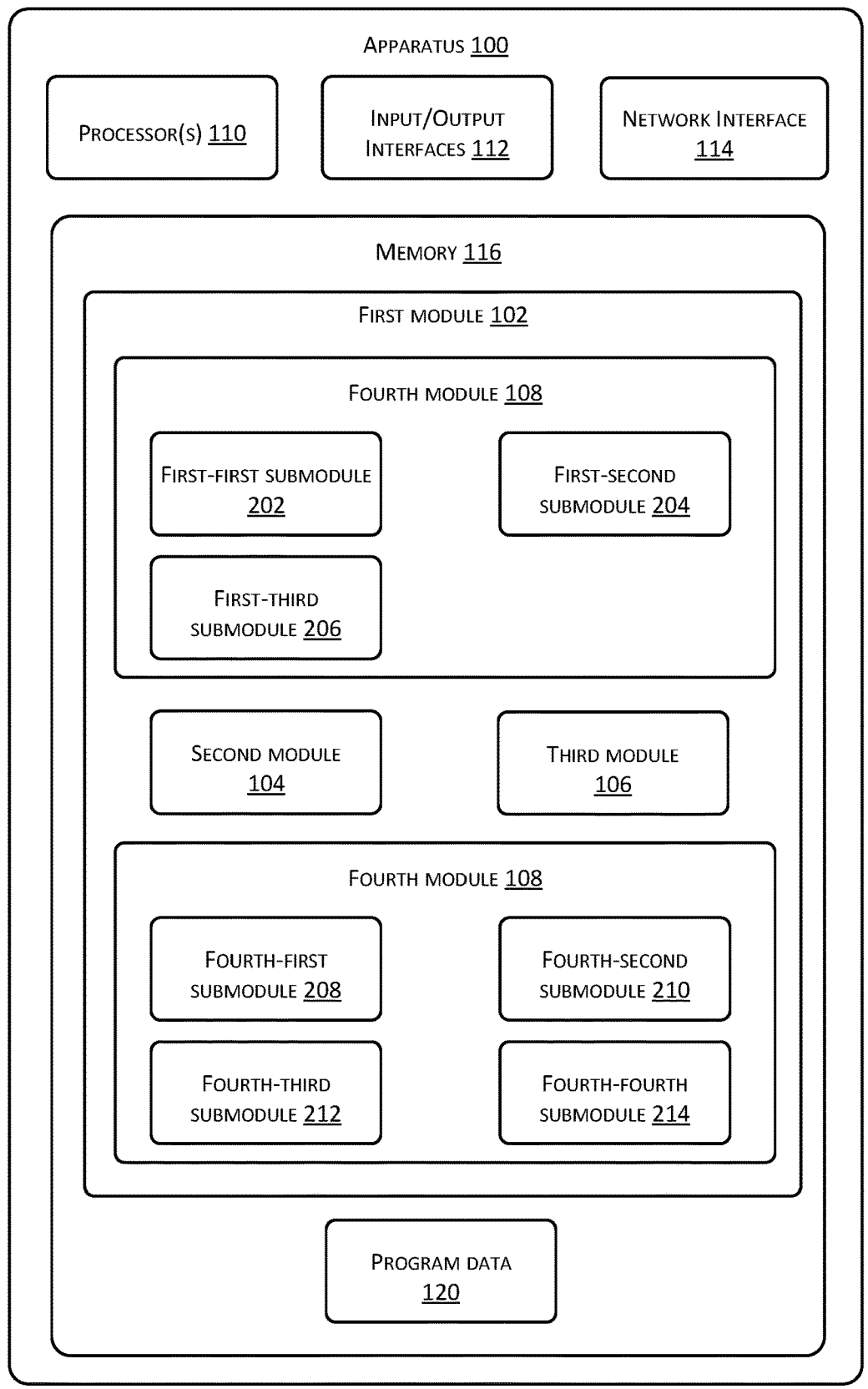
FIG. 2 shows a schematic structural diagram of an apparatus of upgrading a para-virtualized network adapter kernel acceleration module in accordance with the present disclosure in further detail.

FIG. 2 shows a schematic structural diagram of an apparatus of upgrading a para-virtualized network adapter kernel acceleration module in accordance with the present disclosure in further detail. As shown in FIG. 2, the apparatus 100 includes a first module 102, a second module 104, a third module 106, and a fourth module 108.

In implementations, the apparatus 100 may further include one or more processors 110, an input/output (I/O) interface 112, a network interface 114, and memory 116. The memory 116 is an example of a processor-readable media or computer-readable media as described in the foregoing description.

In implementations, the memory 116 may include program modules 118 and program data 120. The program modules 118 may include the first module 102, the second module 104, the third module 106, and the fourth module 108.

The first module 102 is used for switching a network flow of a first para-virtualized network adapter kernel acceleration module to a transmission in a user mode. The second module 104 is used for removing the first para-virtualized network adapter kernel acceleration module. The third module 106 is used for inserting a second para-virtualized network adapter kernel acceleration module. The fourth module 108 is used for switching the transmission of the network flow in the user mode to a transmission by the second para-virtualized network adapter kernel acceleration module.

A para-virtualized network adapter kernel acceleration module can use a KVM-virtualized vhost-net module. A vhost-net module is used for accelerating a para-virtualized network adapter (virtio-net) of a machine virtualizer (QEMU). The first para-virtualized network adapter kernel acceleration module refers to an old vhost-net module prior to an upgrade, and the second para-virtualized network adapter kernel acceleration module refers to a new vhost-net module after the upgrade. The first module switches a network flow of an old vhost-net module to a user mode for transmission. Under the user mode, when sending or receiving a data packet, a virtual machine first runs into a kernel mode, and then returns to a QEMU process of a user mode for processing. The data packet is finally sent or received via a network by a network bridge, a physical network adapter through a virtual Ethernet network device (a TAP device). After switching the network flow of the old vhost-net module to a transmission in the user mode, the second module 104 can remove the old vhost-net module, without any interruption in network services. The third module 106 then inserts the new vhost-net module. The fourth module 108 switches the transmission of the network flow in the user mode to a transmission by the newly upgraded vhost-net module in the kernel mode. Under the kernel mode, the virtual machine does not need to return to the user mode after running into the kernel mode, and processing is performed by a kernel thread of the new vhost-net module. Sending or receiving a data packet is performed by the network bridge, the physical network adapter through the virtual Ethernet network device (a TAP device). By switching between a user mode and a kernel mode, services are not interrupted when an old vhost-net module is removed and a newly upgraded vhost-net module is inserted.

In implementations, the first module 102 may include a first-first sub-module 202, a first-second sub-module 204, and a first-third sub-module 206.

The first-first sub-module 202 is used for a process of a machine virtualizer to obtain a usage status of a shared memory. The first-second sub-module 204 is used for the process of the machine virtualizer to control sending and/or receiving of a data packet in the shared memory. The first-third sub-module 206 is used for stopping a poll of a kernel thread of the first para-virtualized network adapter kernel acceleration module.

The first-first sub-module 202 uses a QEMU process to obtain a usage status of a shared memory (vring). The first-second sub-module 204 uses the QEMU process to control sending and/or receiving of a network data packet in the shared memory. The first-third sub-module 206 stops a poll of a kernel thread of an old vhost-net module about receiving/sending network data packets on a TAP device, switches a network flow of the old vhost-net module to a transmission in the user mode, as a preparation for removing the old vhost-net module. The shared memory is used for storing received/sent network data packets, and each para-virtualized network adapter corresponds to a kernel thread of a vhost-net module.

Optionally, the second module 104 is further used for clearing up resources of the first para-virtualized network adapter kernel acceleration module.

The second module 104 releases data structures used for describing the old vhost-net module from memory associated with the machine virtualizer. These data structures and other codes are used for presenting the vhost-net module in a form of a device for use by the machine virtualizer. The second module 104 then shuts down a handle (/dev/vhost-net) of an export facility of a user mode interface of the old vhost-net module, for completely removing the old vhost-net module.

Optionally, the third module 106 is further used for initializing resources of the second para-virtualized network adapter kernel acceleration module.

After the new vhost-net module is inserted, the third module 106 opens a handle of an export facility of a user mode interface of the new vhost-net module, and invokes a QEMU interface under the user mode, to initialize data structures that describe the new vhost-net module.

In implementations, the fourth module 108 includes a fourth-first sub-module 208, a fourth-second sub-module 210, a fourth-third sub-module 212, and a fourth-fourth sub-module 214.

The fourth-first sub-module 208 is used for creating a kernel thread for the second para-virtualized network adapter kernel acceleration module. The fourth-second sub-module 210 is used for the kernel thread of the second para-virtualized network adapter kernel acceleration module to obtain a usage status of a shared memory. The fourth-third sub-module 212 is used for the kernel thread of the second para-virtualized network adapter kernel acceleration module to control sending and/or receiving of network data packets in the shared memory. The fourth-fourth sub-module 214 is used for opening a poll of the kernel thread of the second para-virtualized network adapter kernel acceleration module.

The fourth-first sub-module 208 causes the new vhost-net module that has been initialized to create a kernel thread. The fourth-second sub-module 210 causes the created kernel thread of the new vhost-net module to obtain a usage status of a shared memory (vring). The fourth-fourth sub-module 214 opens a poll of the kernel thread of the new vhost-net module about receiving/sending network data packets on a TAP device. The fourth-third sub-module 212 causes the kernel thread of the new vhost-net module to control sending and/or receiving of network data packets in the shared memory. The kernel thread that obtains the usage status of the shared memory performs receiving and sending of the network data packets in an order of the shared memory, the TAP device, the network bridge, and the physical network adapter.

Figure 3:
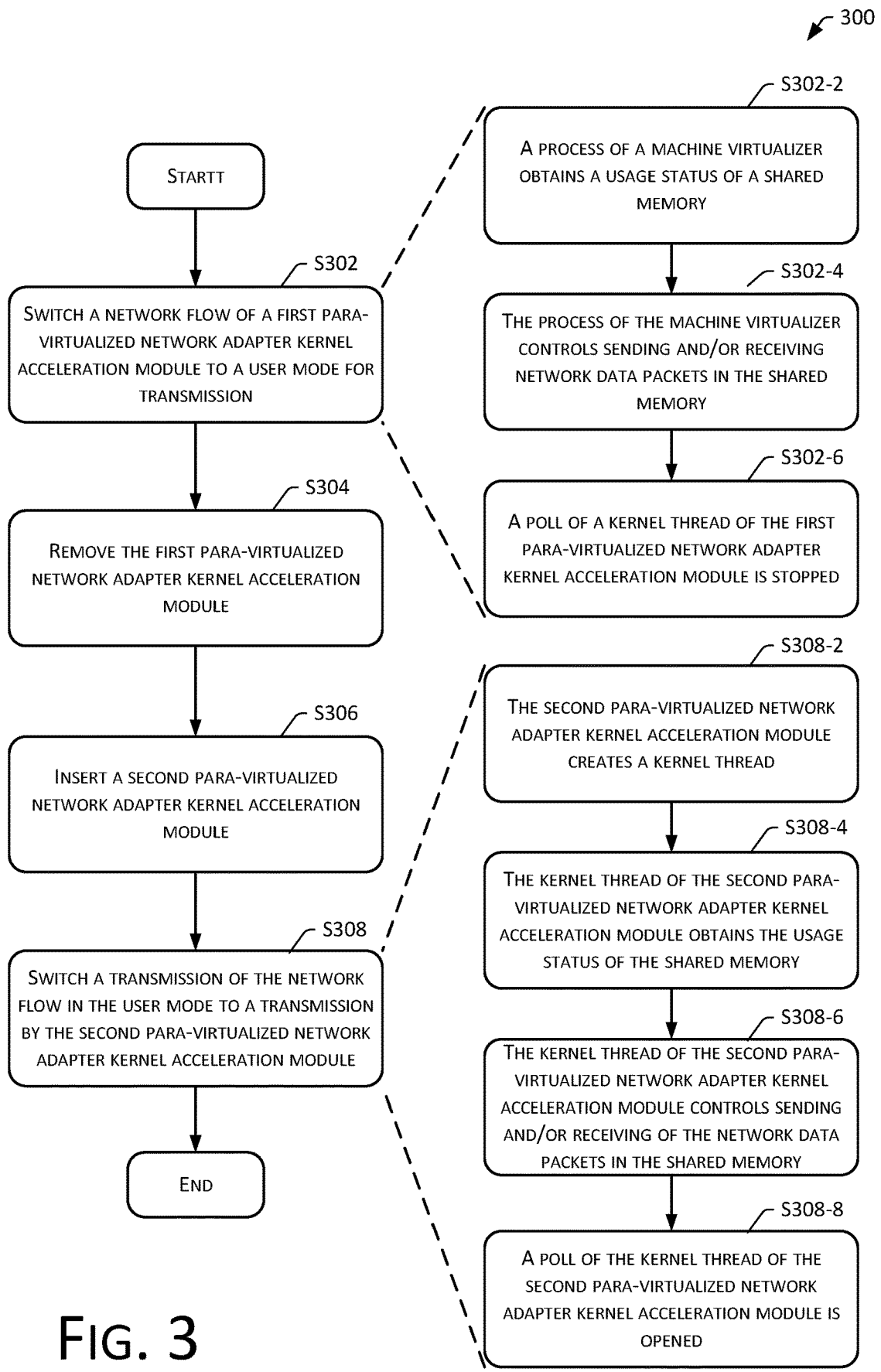
FIG. 3 shows a schematic flowchart of a method of upgrading a para-virtualized network adapter kernel acceleration module in accordance with an aspect of the present disclosure.

FIG. 3 shows a schematic flowchart of a method of upgrading a para-virtualized network adapter kernel acceleration module in accordance with an aspect of the present disclosure. As shown in FIG. 3, the method includes:

S302 switches a network flow of a first para-virtualized network adapter kernel acceleration module to a user mode for transmission.

S304 removes the first para-virtualized network adapter kernel acceleration module.

S306 inserts a second para-virtualized network adapter kernel acceleration module.

S308 switches a transmission of the network flow in the user mode to a transmission by the second para-virtualized network adapter kernel acceleration module.

A para-virtualized network adapter kernel acceleration module can use a KVM-virtualized vhost-net module. A vhost-net module is used for accelerating a para-virtualized network adapter (virtio-net) of a machine virtualizer (QEMU). The first para-virtualized network adapter kernel acceleration module refers to a vhost-net module prior to an upgrade, and the second para-virtualized network adapter kernel acceleration module refers to a new vhost-net module after the upgrade. S302 switches a network flow of the old vhost-net module to a user mode for transmission. Under the user mode, when sending or receiving a data packet, a virtual machine first runs into a kernel mode, and then returns to a QEMU (quick emulator) process of a user mode for processing. The data packet is finally sent or received via a network by a network bridge, a physical network adapter through a virtual Ethernet network device (a TAP device). After switching the network flow of the old vhost-net module to the user mode for transmission, the old vhost-net module can be removed, without any interruption in network services. The new vhost-net module is inserted. The the transmission of the network flow in the user mode is switched to a transmission by the newly upgraded vhost-net module in the kernel mode. Under the kernel mode, the virtual machine does not need to return to the user mode after running into the kernel mode, and processing is performed by a kernel thread of the new vhost-net module. Sending or receiving a data packet is performed by the network bridge, the physical network adapter through the virtual Ethernet network device (a TAP device). By switching between a user mode and a kernel mode, services are not interrupted when an old vhost-net module is removed and a newly upgraded vhost-net module is inserted.

In implementations, switching the network flow of the first para-virtualized network adapter kernel acceleration module to the user mode for transmission at S302 includes:

At S302-2, a process of a machine virtualizer obtains a usage status of a shared memory.

At S302-4, the process of the machine virtualizer controls sending and/or receiving network data packets in the shared memory.

In implementations, switching the network flow of the first para-virtualized network adapter kernel acceleration module to the user mode for transmission at S302 further includes:

At S302-6, a poll of a kernel thread of the first para-virtualized network adapter kernel acceleration module is stopped.

The poll of the kernel thread of the old vhost-net module about receiving/sending of the network data packets on the TAP device is stopped. A poll of a QEMU process about receiving/sending of the network data packets on the TAP device is opened, and the QEMU process is under control to obtain the usage status of the shared memory (vring). The QEMU process handles receiving/sending of network data packets of a network flow after switching. A network flow of the old vhost-net module is switched to the user mode for processing, in preparation for removing the old vhost-net module. The shared memory is used for storing the network data packets.

In implementations, removing the first para-virtualized network adapter kernel acceleration module at S304 further includes clearing up resources of the first para-virtualized network adapter kernel acceleration module.

Data structures used for describing the old vhost-net module are released from memory associated with the machine virtualizer. These data structures and other codes are used for presenting the vhost-net module in a form of a device for use by the machine virtualizer. A handle (/dev/vhost-net) of an export facility of a user mode interface of the old vhost-net module is then closed, for completely removing the old vhost-net module.

In implementations, inserting the second para-virtualized network adapter kernel acceleration module at S306 further includes initializing resources of the second para-virtualized network adapter kernel acceleration module.

After the new vhost-net module is inserted, a handle of an export facility of a user mode interface of the new vhost-net module is opened, and a QEMU interface is invoked under the user mode, to initialize data structures that describe the new vhost-net module in the memory.

In implementations, switching the transmission of the network flow in the user mode to the transmission by the second para-virtualized network adapter kernel acceleration module at S308 includes:

At S308-2, the second para-virtualized network adapter kernel acceleration module creates a kernel thread.

At S308-4, the kernel thread of the second para-virtualized network adapter kernel acceleration module obtains the usage status of the shared memory.

At S308-6, the kernel thread of the second para-virtualized network adapter kernel acceleration module controls sending and/or receiving of the network data packets in the shared memory.

In implementations, switching the transmission of the network flow in the user mode to the transmission by the second para-virtualized network adapter kernel acceleration module at S308 further includes:

At S308-8, a poll of the kernel thread of the second para-virtualized network adapter kernel acceleration module is opened.

A new vhost-net module creates a kernel thread, and controls the kernel thread to obtain a usage status of a shared memory. The new vhost-net module opens a poll of the kernel thread about receiving/sending network data packets on the TAP device, to switch a network flow transmitted in the user mode to the new vhost-net module. The kernel thread that obtains the usage status of the shared memory performs receiving and sending of the network data packets in an order of the shared memory, the TAP device, the network bridge, and the physical network adapter.

Figure 4:
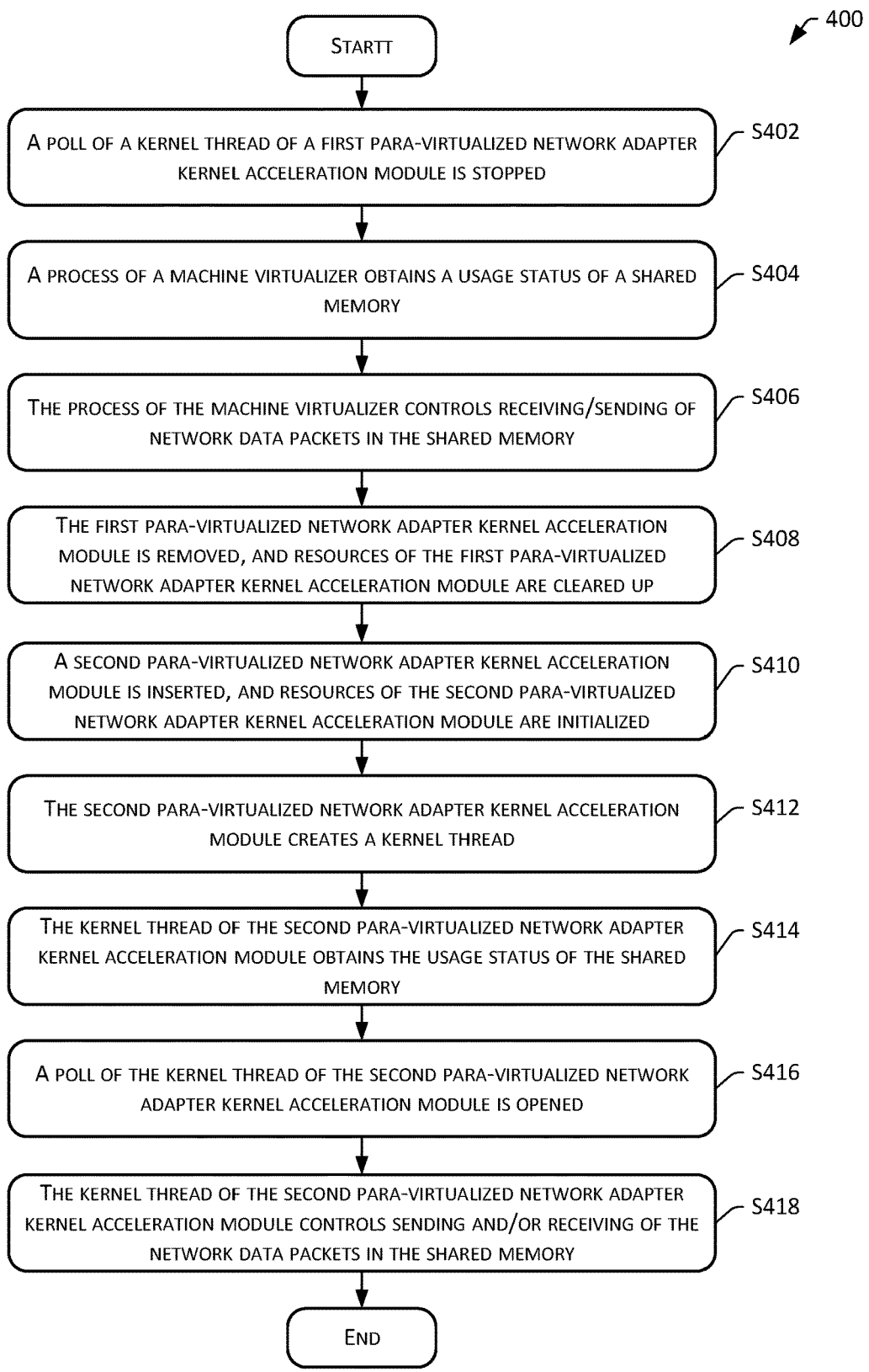
FIG. 4 shows a schematic flowchart of a method of upgrading a para-virtualized network adapter kernel acceleration module in accordance with another aspect of the present disclosure.

FIG. 4 shows a schematic flowchart of a method of upgrading a para-virtualized network adapter kernel acceleration module in accordance with another aspect of the present disclosure. As shown in FIG. 4, the method includes:

At S402, a poll of a kernel thread of a first para-virtualized network adapter kernel acceleration module is stopped.

A poll of a kernel thread of the old vhost-net module about receiving/sending of network data packets on a TAP device is stopped.

At S404, a process of a machine virtualizer obtains a usage status of a shared memory.

A poll of a QEMU process about receiving/sending of network data packets on a TAP device is opened, and the QEMU process is under control to obtain the usage status of the shared memory.

At S406, the process of the machine virtualizer controls receiving/sending of network data packets in the shared memory.

The QEMU process handles receiving/sending of network data packets of a network flow after switching. A network flow of the old vhost-net module is switched to the user mode for processing, in preparation for removing the old vhost-net module.

At S408, the first para-virtualized network adapter kernel acceleration module is removed, and resources of the first para-virtualized network adapter kernel acceleration module are cleared up.

Data structures used for describing the old vhost-net module are released from memory associated with the machine virtualizer. These data structures and other codes are used for presenting the vhost-net module in a form of a device for use by the machine virtualizer. A handle (/dev/vhost-net) of an export facility of a user mode interface of the old vhost-net module is closed, thus completely removing the old vhost-net module.

At S410, a second para-virtualized network adapter kernel acceleration module is inserted, and resources of the second para-virtualized network adapter kernel acceleration module are initialized.

After a new vhost-net module is inserted, a handle of an export facility of a user mode interface of the new vhost-net module is opened, and a QEMU interface is invoked under the user mode, to initialize data structures that describe the new vhost-net module in the memory.

At S412, the second para-virtualized network adapter kernel acceleration module creates a kernel thread.

At S414, the kernel thread of the second para-virtualized network adapter kernel acceleration module obtains the usage status of the shared memory.

The new vhost-net module creates a kernel thread, and the kernel thread obtains the usage status of the shared memory.

At S416, a poll of the kernel thread of the second para-virtualized network adapter kernel acceleration module is opened.

A poll of the kernel thread of the new vhost-net module about receiving/sending network data packets on a TAP device is opened.

At S418, the kernel thread of the second para-virtualized network adapter kernel acceleration module controls sending and/or receiving of the network data packets in the shared memory.

A network flow transmitted in the user mode is switched to the new vhost-net module, and receiving and sending of the network data packets are performed in an order of the shared memory, the TAP device, the network bridge, and the physical network adapter.

It should be noted that the present disclosure can be implemented using software and/or a combination of software and hardware, for example, can be implemented using an application-specific integrated circuit (ASIC) via a target computer or any other similar hardware devices. In an embodiment, a software program of the present disclosure can implement the foregoing steps or functions through an execution of processor(s). Similar, the software program (including related data structure(s)) of the present disclosure can be stored in a computer-readable recording media, such as a RAM storage device, a magnetic or optical drive or floppy disk, or similar devices. Moreover, some operations or functions of the present disclosure can be implemented using hardware, such as circuits that cooperate with processor(s) to implement various operations or functions.

Furthermore, a portion of the present disclosure can be applied as a computer program product. Examples include computer program instructions that, when executed by a computer, can invoke or provide the method and/or the technical solution of the present disclosure through operations of the computer. The program instructions that invoke the method of the present disclosure can be stored in a fixed or movable recording media, and/or can be transmitted through a data flow in a transmission or other signal carrier media, and/or can be stored in working memory of a computing device that runs according to the program instructions. According to an embodiment of the present disclosure which includes an apparatus, the apparatus includes a storage device that is used for storing computer program instructions and processor(s) that is/are used for executing the program instructions. When the computer program instructions are executed by the processor(s), the apparatus is instructed to run the method and/or the technical solution according to the foregoing embodiments of the present disclosure.

It is apparent to one skilled in art that the present disclosure is not limited to the details of the exemplary embodiments as described above. The present disclosure can be implemented in other forms without departing the spirit and the basic features of the present disclosure. Therefore, regardless of which point of view, the embodiments are considered as exemplary, and not limiting. The scope of the present disclosure is defined by the appended claims and not the above description. Therefore, all variations having meanings and scopes that are equivalent to the appended claims shall be covered by the present disclosure. Drawing labels in the appended claims should not be construed as limitations to the corresponding appended claims. Furthermore, a term "including" apparently does not exclude other units or acts, and a singular form does not exclude a plural form. Multiple units or apparatuses described in the appended apparatus claims can be implemented by a single unit or apparatus using a software or hardware component. Terms such as first, second, etc., are used for representing names, and do not imply any particular order.

What is claimed is:

1. A method comprising:
    stopping a poll of a kernel thread of a first para-virtualized network adapter kernel acceleration module;
    obtaining, by a process of a machine virtualizer, a usage status of a shared memory and controlling receiving/sending of network data packets in the shared memory;
    removing the first para-virtualized network adapter kernel acceleration module;
    inserting a second para-virtualized network adapter kernel acceleration module;
    obtaining, by a kernel thread of a second para-virtualized network adapter kernel acceleration module, the usage status of the shared memory;
    opening a poll of a kernel thread of the second para-virtualized network adapter kernel acceleration module; and
    controlling, by the kernel of the second para-virtualized network adapter kernel acceleration module, sending and/or receiving of the network data packets in the shared memory.

2. The method of claim 1, wherein stopping the poll of the kernel thread of the first para-virtualized network adapter kernel acceleration module comprises stopping a poll of a kernel thread of an old vhost-net module about receiving/sending of network data packets on a virtual Ethernet network (TAP) device.

3. The method of claim 2, wherein by the process of the machine virtualizer, obtaining the usage status of the shared memory and controlling receiving/sending of the network data packets in the shared memory includes:
    opening a poll of a quick emulator (QEMU) process about receiving/sending of the network data packets on the TAP device;
    obtaining the usage status of the shared memory by controlling the QEMU process;
    handling, by the QEMU process, receiving/sending of the network data packets of a network flow after switching a network flow of the old vhost-net module to a user mode for processing.

4. The method of claim 1, wherein removing the first para-virtualized network adapter kernel acceleration module comprises clearing up resources of the first para-virtualized network adapter kernel acceleration module.

5. The method of claim 1, wherein inserting the second para-virtualized network adapter kernel acceleration module comprises initializing resources of the second para-virtualized network adapter kernel acceleration module.

6. The method of claim 1, further comprising, subsequent to inserting the second para-virtualized network adapter kernel acceleration module:
    creating, by the second para-virtualized network adapter kernel acceleration module, the kernel thread of the second para-virtualized network adapter kernel acceleration module.

7. The method of claim 6, wherein creating, by the second para-virtualized network adapter kernel acceleration module, the kernel thread of the second para-virtualized network adapter kernel acceleration module includes:
    creating, by a new vhost-net module, a kernel thread that obtains the usage status of the shared memory.

8. An apparatus comprising:
    one or more processors;
    memory storing executable instructions that, when executed by the one or more processors, cause the one or more processors to perform acts comprising:
        stopping a poll of a kernel thread of a first para-virtualized network adapter kernel acceleration module;

obtaining, by a process of a machine virtualizer, a usage status of a shared memory and controlling receiving/sending of network data packets in the shared memory;
removing the first para-virtualized network adapter kernel acceleration module;
inserting a second para-virtualized network adapter kernel acceleration module;
obtaining, by a kernel thread of a second para-virtualized network adapter kernel acceleration module, the usage status of the shared memory;
opening a poll of a kernel thread of the second para-virtualized network adapter kernel acceleration module; and
controlling, by the kernel of the second para-virtualized network adapter kernel acceleration module, sending and/or receiving of the network data packets in the shared memory.

9. The apparatus of claim 8, wherein stopping the poll of the kernel thread of the first para-virtualized network adapter kernel acceleration module comprises:
stopping a poll of a kernel thread of an old vhost-net module about receiving/sending of network data packets on a virtual Ethernet network (TAP) device.

10. The apparatus of claim 9, wherein by the process of the machine virtualizer, obtaining the usage status of the shared memory and controlling receiving/sending of the network data packets in the shared memory includes:
opening a poll of a quick emulator (QEMU) process about receiving/sending of the network data packets on the TAP device;
obtaining the usage status of the shared memory by controlling the QEMU process;
handling, by the QEMU process, receiving/sending of the network data packets of a network flow after switching a network flow of the old vhost-net module to a user mode for processing.

11. The apparatus of claim 8, wherein clearing up resources of the first para-virtualized network adapter kernel acceleration module comprises clearing up resources of the first para-virtualized network adapter kernel acceleration module.

12. The apparatus of claim 8, wherein inserting the second para-virtualized network adapter kernel acceleration module comprises initializing resources of the second para-virtualized network adapter kernel acceleration module.

13. The apparatus of claim 8, wherein, subsequent to inserting the second para-virtualized network adapter kernel acceleration module, the acts further comprise:
creating, by a new vhost-net module, a kernel thread that obtains the usage status of the shared memory.

14. One or more computer-readable media storing executable instructions that, when executed by one or more processors, cause the one or more processors to perform acts comprising:
stopping a poll of a kernel thread of a first para-virtualized network adapter kernel acceleration module;
obtaining, by a process of a machine virtualizer, a usage status of a shared memory and controlling receiving/sending of network data packets in the shared memory;
removing the first para-virtualized network adapter kernel acceleration module;
inserting a second para-virtualized network adapter kernel acceleration module;
obtaining, by a kernel thread of a second para-virtualized network adapter kernel acceleration module, the usage status of the shared memory;
opening a poll of a kernel thread of the second para-virtualized network adapter kernel acceleration module; and
controlling, by the kernel of the second para-virtualized network adapter kernel acceleration module, sending and/or receiving of the network data packets in the shared memory.

15. The one or more computer-readable media of claim 14, wherein stopping the poll of the kernel thread of the first para-virtualized network adapter kernel acceleration module comprises stopping a poll of a kernel thread of an old vhost-net module about receiving/sending of network data packets on a virtual Ethernet network (TAP) device.

16. The one or more computer-readable media of claim 15, wherein by the process of the machine virtualizer, obtaining the usage status of the shared memory and controlling receiving/sending of the network data packets in the shared memory includes:
opening a poll of a quick emulator (QEMU) process about receiving/sending of the network data packets on the TAP device;
obtaining the usage status of the shared memory by controlling the QEMU process;
handling, by the QEMU process, receiving/sending of the network data packets of a network flow after switching a network flow of the old vhost-net module to a user mode for processing.

17. The one or more computer-readable media of claim 14, wherein removing the first para-virtualized network adapter kernel acceleration module comprises clearing up resources of the first para-virtualized network adapter kernel acceleration module.

18. The one or more computer-readable media of claim 14, wherein inserting the second para-virtualized network adapter kernel acceleration module comprises initializing resources of the second para-virtualized network adapter kernel acceleration module.

19. The one or more computer-readable media of claim 14, wherein, subsequent to inserting the second para-virtualized network adapter kernel acceleration module, the acts further comprise creating, by the second para-virtualized network adapter kernel acceleration module, the kernel thread of the second para-virtualized network adapter kernel acceleration module.

20. The one or more computer-readable media of claim 19, wherein creating, by the second para-virtualized network adapter kernel acceleration module, the kernel thread of the second para-virtualized network adapter kernel acceleration module includes creating, by a new vhost-net module, a kernel thread that obtains the usage status of the shared memory.

* * * * *